United States Patent
Iida et al.

(10) Patent No.: US 6,826,895 B2
(45) Date of Patent: Dec. 7, 2004

(54) ELECTRIC LAWN MOWER

(75) Inventors: Tetsuo Iida, Wako (JP); Takao Kobayashi, Wako (JP); Toshiaki Takizawa, Wako (JP); Norikazu Shimizu, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/177,835

(22) Filed: Jun. 21, 2002

(65) Prior Publication Data

US 2003/0037525 A1 Feb. 27, 2003

(30) Foreign Application Priority Data

Aug. 22, 2001 (JP) ........................................ 2001-252058

(51) Int. Cl.⁷ .............................................. A01D 69/00
(52) U.S. Cl. ...................................................... 56/11.9
(58) Field of Search ........................ 56/1, 11.9, 320.1; 180/229

(56) References Cited

U.S. PATENT DOCUMENTS

| | | | |
|---|---|---|---|
| 3,564,186 A | * 2/1971 | Mittelstadt et al. | 200/331 |
| 3,581,480 A | * 6/1971 | O'Connor et al. | 56/11.9 |
| 3,759,023 A | * 9/1973 | Comer | 56/320.1 |
| 3,924,389 A | * 12/1975 | Kita | 56/10.2 A |
| 3,973,378 A | * 8/1976 | Bartasevich et al. | 56/11.9 |
| 4,158,280 A | * 6/1979 | Thomas et al. | 56/202 |
| 4,312,421 A | * 1/1982 | Pioch | 181/202 |
| 4,407,112 A | * 10/1983 | Shepherd et al. | 56/13.4 |
| 4,711,077 A | * 12/1987 | Kutsukake et al. | 56/320.2 |
| 5,113,642 A | * 5/1992 | Dunn | 56/12.8 |
| 5,402,626 A | * 4/1995 | Zinck | 56/11.9 |
| 5,442,901 A | * 8/1995 | Niemela et al. | 56/11.9 |
| 5,490,370 A | * 2/1996 | McNair et al. | 56/11.9 |
| 5,507,137 A | * 4/1996 | Norris | 56/10.2 J |
| 5,526,633 A | * 6/1996 | Strong et al. | 56/17.2 |
| 5,619,845 A | * 4/1997 | Bruener et al. | 320/137 |
| 5,910,091 A | * 6/1999 | Iida et al. | 56/16.7 |
| 5,937,622 A | * 8/1999 | Carrier et al. | 56/11.9 |
| 5,953,890 A | * 9/1999 | Shimada et al. | 56/11.9 |
| 6,018,937 A | * 2/2000 | Shimada et al. | 56/10.5 |
| D458,277 S | * 6/2002 | Stratford | D15/14 |
| 6,651,900 B1 | * 11/2003 | Yoshida | 239/72 |
| 6,658,829 B2 | * 12/2003 | Kobayashi et al. | 56/10.5 |
| 6,666,008 B2 | * 12/2003 | Iida et al. | 56/11.9 |

FOREIGN PATENT DOCUMENTS

| JP | 2880116 | 12/1996 |
|---|---|---|
| JP | 2837960 | 3/1998 |

* cited by examiner

Primary Examiner—Thomas B. Will
Assistant Examiner—Alicia Torres
(74) Attorney, Agent, or Firm—Adams & Wilks

(57) ABSTRACT

In an electric lawn mower, a rechargeable battery and an electric motor activatable by the battery are mounted in a machine body section, and a cutter blade is provided within a cutter housing and rotatable via the electric motor to cut grass. Cover member collectively covers the battery and electric motor. The cover member is shaped to progressively slant upward in a front-to-rear direction of the machine body section, and the cover member has an opening formed in its lower front end portion and an air vent formed in its rear end portion to thereby permit ventilation from the opening to the air vent such that the battery and electric motor can be cooled by air flows.

21 Claims, 12 Drawing Sheets

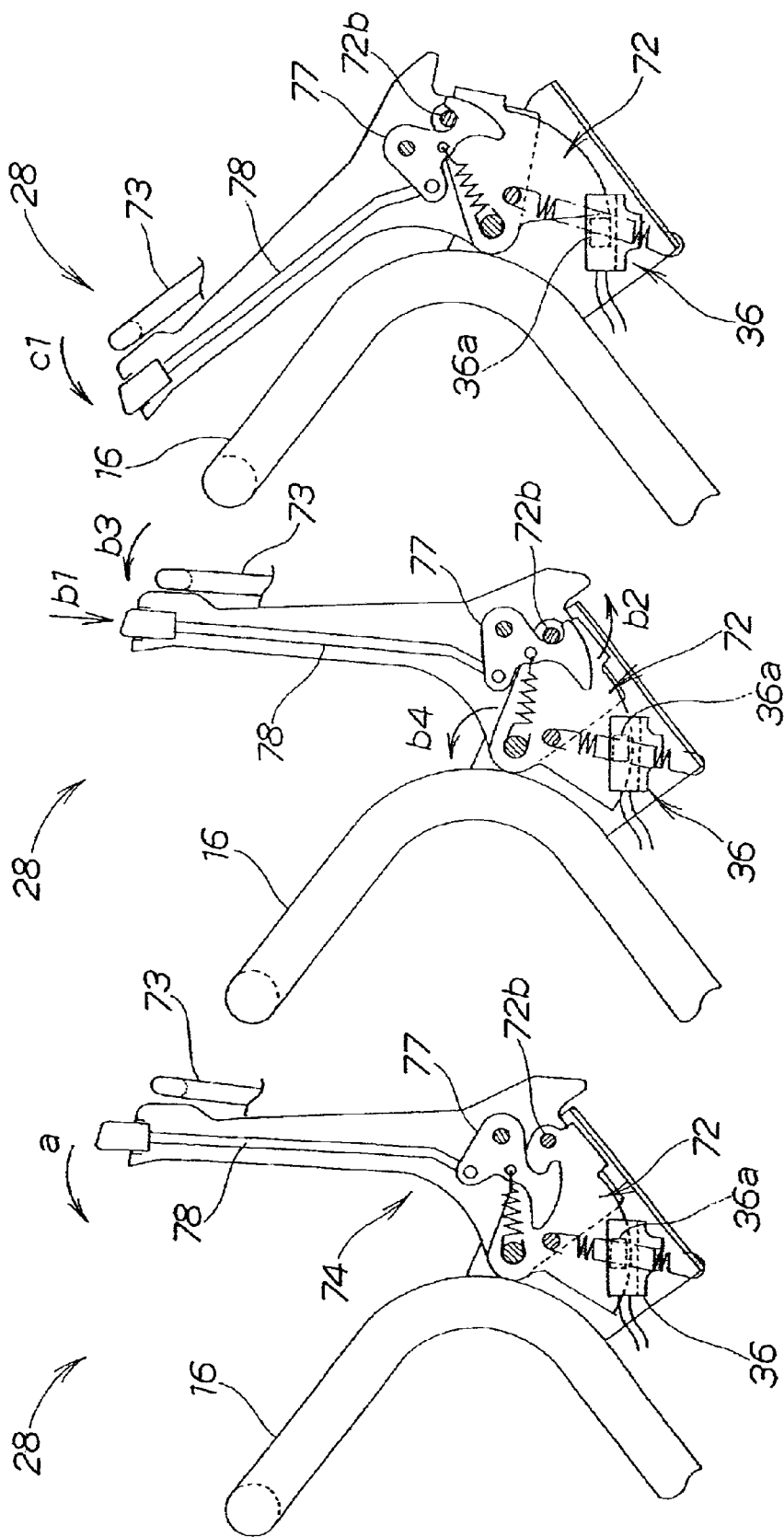

ELECTRIC LAWN MOWER

FIELD OF THE INVENTION

The present invention relates to electric lawn mowers of a type where an electric motor is activated by a battery to rotate a cutter blade within a cutter housing.

BACKGROUND OF THE INVENTION

Various electric lawn mowers have been known, among which are a battery-powered lawn mower disclosed in Japanese Patent No. 2,837,960 and an electric lawn cutting system disclosed in Japanese Patent No. 2,880,116.

The battery-powered lawn mower disclosed in U.S. Pat. No. 2,837,960 includes an electric motor that is mounted on a vehicle chassis and covered with a shroud and housing having a battery pack accommodated in a container provided on the housing. The electric lawn cutting system disclosed in U.S. Pat. No. 2,880,116 includes an electric motor that is mounted to a lower housing via a metal support plate and covered with a lower portion of an upper housing. In the cutting system, batteries are mounted on the lower portion of the upper housing and covered with an upper portion of the upper housing.

However, in the above-discussed battery-powered lawn mower, a considerable amount of heat of the electric motor tends to be trapped within the shroud and housing, and it is desirable that arrangements be made to allow the heat to effectively escape from within the shroud and housing. Further, in the above-discussed electric lawn cutting system, a considerable amount of heat of the electric motor tends to be trapped in the lower portion of the upper housing, and a considerable amount of heat of the batteries tends to be trapped in the upper housing. Thus, in this case too, it is desirable that arrangements be made to deal with the heat of the batteries and motor in an effective and efficient manner.

SUMMARY OF THE INVENTION

In view of the foregoing prior art problems, it is an object of the present invention to provide an improved electric lawn mower which is capable of long-time continuous operation without suffering from the heat of the battery and electric motor.

According to an aspect of the present invention, there is provided an improved electric lawn mower of a type which comprises a machine body section, a rechargeable battery, an electric motor activatable by the battery, and a cutter blade provided within a cutter housing and rotatable via the electric motor to cut the grass. The lawn mower of the invention further comprises a cover member collectively covering the battery and electric motor. The cover member in the invention is shaped to progressively slant upward in a front-to-rear direction of the machine body section, and the cover member has an opening formed in its lower front end portion and an air vent formed in its rear end portion to thereby permit ventilation from the opening to the air vent such that the battery and the electric motor can be cooled by air flows. Such arrangements can effectively prevent the battery unit and motor from overheating, which thereby allows the electric lawn mower to withstand long-time continuous operation or use.

In a specific implementation, the cutter housing defines a communication hole communicating with an interior space defined by the cover member. When the cutter blade is rotating, the communication hole allows an air flow to be produced from the opening and air vent into the cutter housing, while when the cutter blade is not rotating, the communication hole allows a reverse air flow to be produced from within the cutter housing to the air vent due to heat of the battery and/or elecetric motor. This arrangement can promote hear radiation from the battery and motor.

BRIEF DESCRIPTION OF THE DRAWINGS

Certain preferred embodiments of the present invention will hereinafter be described in detail, by way of example only, with reference to the accompanying drawings, in which:

FIGS. 13A to 13C are views explanatory of behavior of the switch operation mechanism in the electric lawn mower.

DETAILED DESCRIPTION OF THE PREFERRED EMBODIMENTS

Figure 1:
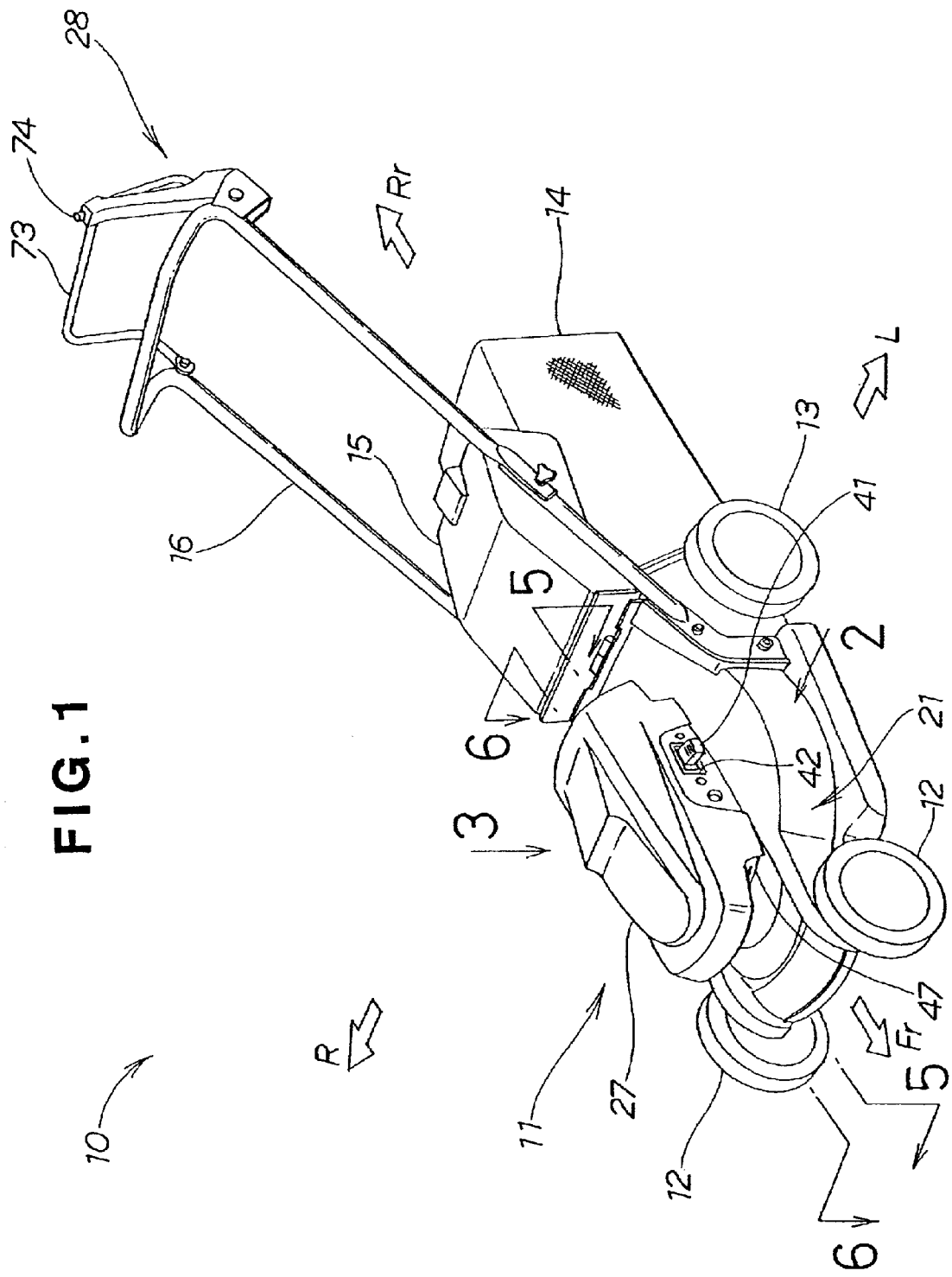
FIG. 1 is a perspective view of an electric lawn mower in accordance with an embodiment of the present invention.

In the following description, the terms "front", "rear", "left", "right", "upper" and "lower" denote directions as viewed from a human operator of an electric lawn. In the drawings, "Fr" indicates "front", "Rr" rear, "L" left, and "R" right.

FIG. 1 is a perspective view of an electric lawn mower in accordance with an embodiment of the present invention. The electric lawn mower 10 includes a machine body section 11, front wheels 12, rear wheels 13, a grass bag 14, a discharge port cover 15, a handle 16, a cutter housing 21, a cover member 27, and a switch operation mechanism 28. The electric lawn mower 10 also includes a power on/off key (main key) 41 that functions as a connecting member or male plug for removable insertion into a relay member 42, functioning as a machine-side female socket or power switch, for turning on/off the lawn mower 10.

Figure 4:
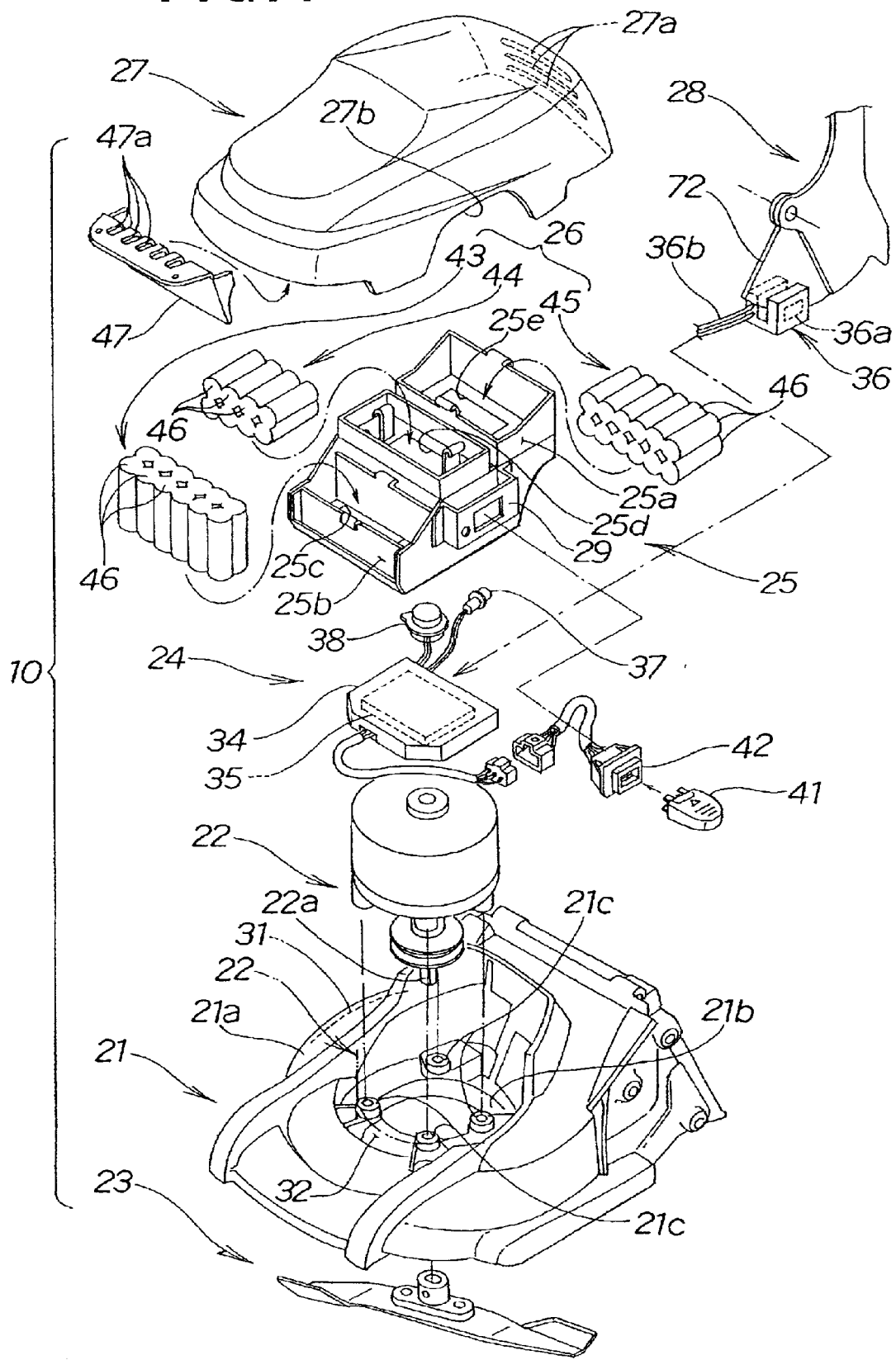
FIG. 4 is an exploded perspective view of the electric lawn mower of FIG. 1.

As seen from a combination of FIGS. 1 and 4, the switch operation mechanism 28 includes a noncontact reed switch 36 for performing ON/OFF control of an electric motor 22, a generally-fan-shaped actuating member 72 pivotally mounted on the handle 16 for setting an ON/OFF state of the reed switch 36, a handling lever 73 for causing the actuating member 72 to pivot and a clutch mechanism 74.

Importantly, the electric lawn mower 10 of the present invention is designed to compulsorily cool, by air flows, the electric motor 22 and batteries collectively covered with the cover member 27, as will become clearer as the description proceeds.

Figure 2:
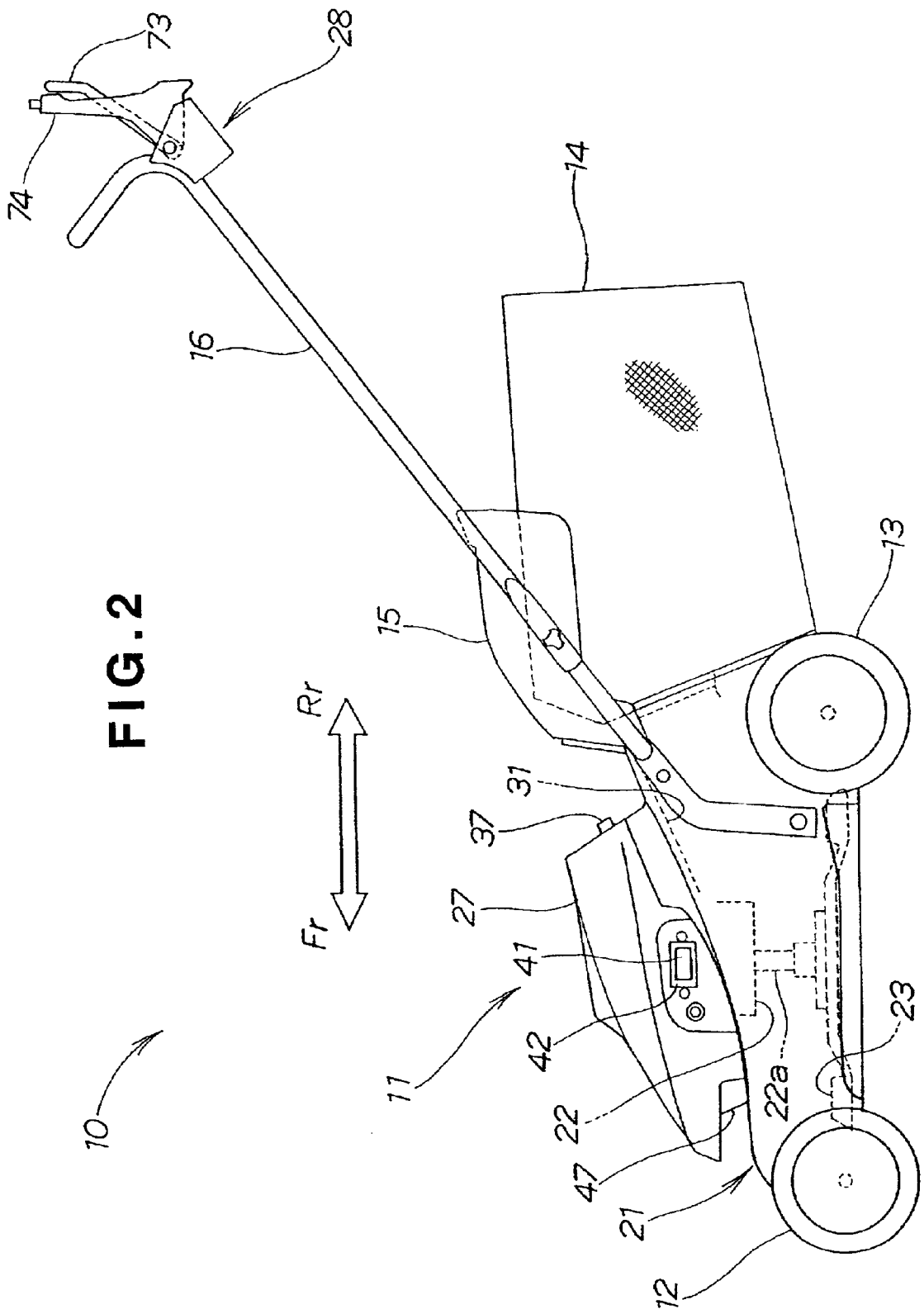
FIG. 2 is a side view of the electric lawn mower taken in a direction of arrow "2" of FIG. 1.

FIG. 2 is a side view of the electric lawn mower 10 taken in a direction of arrow "2" of FIG. 1. This electric lawn mower 10 is constructed as a so-called rear-discharge type lawn mower. Namely, the electric motor 22 is turned on or off by the power on/off key 41 being inserted into or removed from the relay member (or machine-side power switch) 42 provided in the machine body section 11. Cutter blade 23 within the cutter housing 21 is rotated by the electric motor 22 to cut the grass, and resulting grass clippings are delivered, through a scroll portion 31 within the cutter housing 21, to a rear portion of the machine body section 11 so that the grass clippings are ultimately collected into the grass bag 14.

Figure 3:
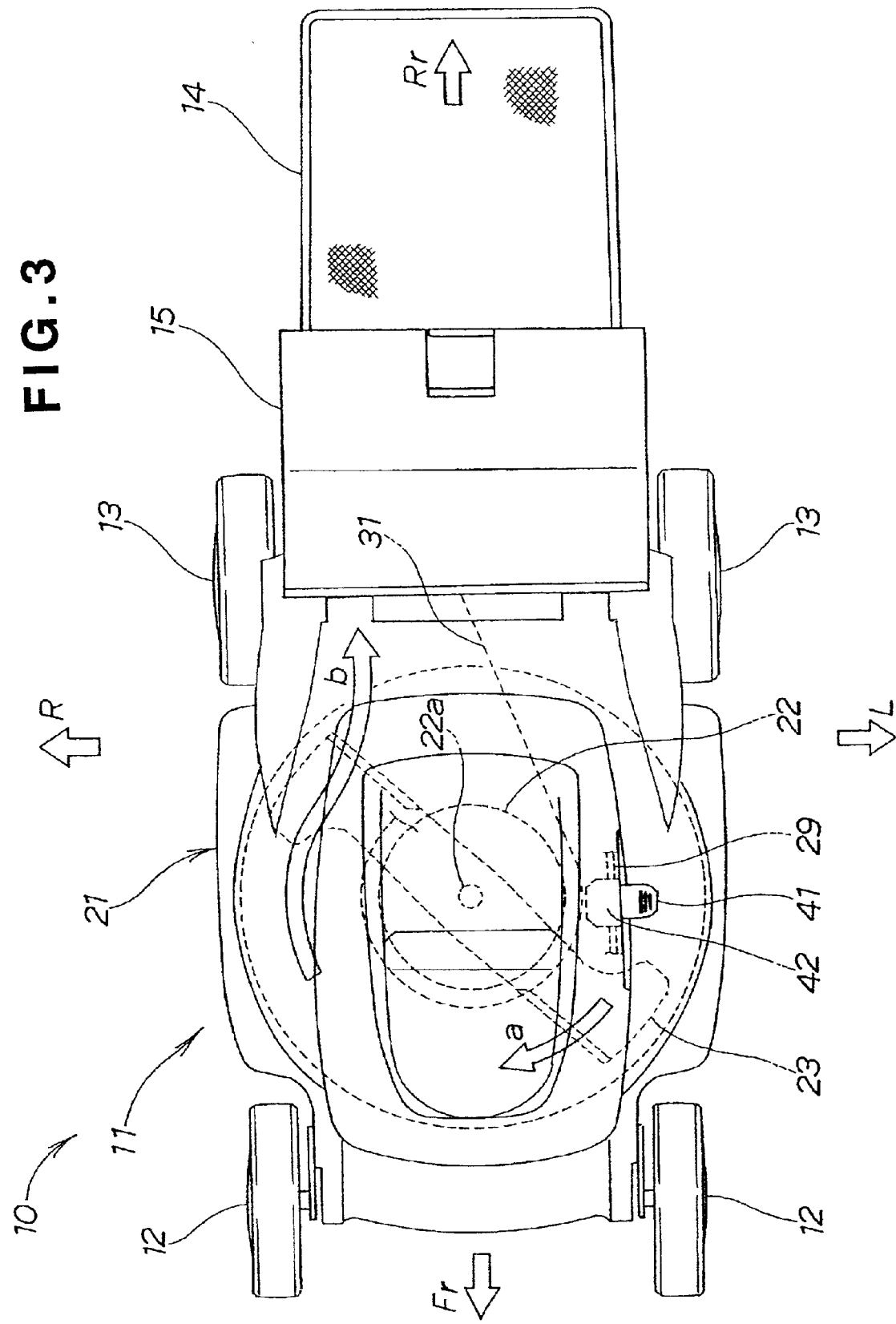
FIG. 3 is a plan view of the electric lawn mower taken in a direction of arrow "3" of FIG. 1.

FIG. 3 is a plan view of the electric lawn mower 10 taken in a direction of arrow "3" of FIG. 1. Inserting the power on/off key 41 in the relay member 42 and manipulating the switch operation mechanism 28 shown in FIG. 1 can turn on the electric motor 22, and the thus-activated motor 22 can in turn rotate the cutter blade 23 as denoted by arrow "a" to cut the grass. The resulting grass clippings are driven, by vortexes produced by the rotating cutter blade 23, into the grass bag 14 through the scroll portion 31 of the cutter housing 21, as denoted by arrow "b". Namely, in this rear-discharge-type electric lawn mower 10, the scroll portion 31 is disposed at one of left or right sides of the machine body section 11 while the relay member 42 for removal insertion therein of the power on/off key or main key 41 is disposed at the other of the left or right sides of the machine body section 11.

Generally, in the rear-discharge-type electric lawn mowers where grass clippings are delivered, through the scroll portion, to a rear portion of the machine body section to be ultimately collected into the grass bag, there arises a need to clean the scroll portion from time to time because the grass clippings tend to adhere to the surface of the scroll portion; thus, it is preferable that the electric lawn mowers be constructed in such a manner as to facilitate the cleaning of the scroll portion.

This is why the scroll portion 31 in the instant embodiment is provided at one of the left or right sides of the machine body section 11 while the relay member 42 is provided at the other of the left or right sides via a mounting bracket 29. With this arrangement, the human operator can easily access and clean the scroll portion 31 after he or she first pulls out the power on/off key 41 from the relay member 42 on the other side of the body section 11 and then lays the machine body section 11 down sideways with the one side (scroll-portion side) facing upward. That is, the human operator can attend to the removal of the power on/off key 41 and sideways laying-down of the machine body section 12 from a same operating position, so that the efficiency and ease in the cleaning operations can be greatly enhanced.

The following paragraphs detail the construction of the rear-discharge-type electric lawn mower 10 of the present invention.

FIG. 4 is an exploded perspective view of the electric lawn mower 10, which shows principal components of the lawn mower 10. As shown, the electric motor 22 is mounted in the cutter housing 21, the cutter blade 23 is connected to a rotation shaft 22a of the motor 22, and a control section 24 is disposed above the motor 22. The electric lawnmower 10 also includes a battery bracket 25 attached to the cutter housing 21 from above the motor 22 and battery unit 26 supported on the battery bracket 25. The cover member 27 collectively covers the electric motor 22, control section 24, battery bracket 25 and battery unit 26, and ON/OFF control of the electric motor 22 is performed via the switch operation mechanism 28. Preferably, the battery bracket 25 is secured to the cutter housing 21 at the same time that the motor 22 is secured to the cutter housing 21.

The cutter housing 21 has a relatively large upward opening 21b receiving therein a bottom portion of the motor 22, and a plurality of bosses 21c by which the motor 22 is fixed to the body 21a of the cutter housing 21. The housing body 21a has the scroll portion 31 formed therein for delivering the grass clippings to the rear grass bag 14 while simultaneously permitting the rotation of the cutter blade 23. With the electric motor 22 mounted by means of the cutter housing bosses 21c, there are formed communication holes 32 (only one of which is shown in FIG. 4) communicating between the interior and exterior of the cutter housing 21.

The control section 24 includes a casing 34 and a control board 35 accommodated in the casing 34. The control board 35 is coupled with the above-mentioned noncontact reed switch 36 that constitutes an important part of the switch operation mechanism 28 for controlling the motor 22. To the control board 35 is also connected a display lamp 37 for being normally illuminated to inform the human operator that the electric lawn mower 10 is in operable condition, as well as a buzzer 38 that keeps sounding while the machine body section 11 is traveling or performing any of various operations as instructed by the human operator. The control section 24 also includes the above-mentioned power on/off key 41 and relay member 42 cooperating to power on the lawn mower 10. Note that the relay member 42 functions also as a connector for recharging the battery unit 26 as will be later described.

The battery bracket 25, which is preferably made of a metal material, includes a body portion 25a that covers the sides and top of the electric motor 22, a forward extension 25b extending horizontally forward from the body portion 25a, and the mounting bracket 29 to which the relay member 42 is fitted. The battery bracket 25 is secured to the cutter housing 21 along with the motor 22, as stated earlier. The body portion 25a has air vents 25d and 25e, and the forward extension 25b has an air vent 25c.

As stated above, the electric lawnmower 10 of the present invention has the battery bracket 25 and electric motor 22 secured together to the cutter housing 21. Thus, it is possible to assemble the electric lawn mower 10 with enhanced efficiency.

The battery unit 26, which is mounted on an upper portion of the cutter housing 21 and preferably a nickel-cadmium battery unit, comprises a front battery 43 and first and second upper batteries 44 and 45. The front battery 43 comprises a group of electric cells 46 each having a rated voltage of 1.2 V, and this front battery 43 is mounted on the forward extension 25b of the battery bracket 25 with each of the cells placed in an upright position. The first and second upper batteries 44 and 45 each comprise a group of electric cells 46 each having a rated voltage of 1.2 V similarly to the front battery 43, and these upper batteries 44 and 45 are mounted on the body portion 25a of the battery bracket 25 with each of the cells placed in a horizontal position.

The battery unit 26 may comprise other high-performance batteries than the nickel-cadmium batteries, such as other types of nickel- or lithium-based batteries. It is generally known that the temperature of the nickel- or lithium-based batteries can be controlled relatively easily during recharging operations. Thus, in the instant embodiment, the battery unit 26 comprising such nickel- or lithium-based batteries can be recharged with significantly improved efficiency.

The cover member 27, which is preferably made of resin, includes a louver 47 provided on its lower front portion and having openings 47a for air currents to and from the interior of the cover member 27. The cover member 27 also has air vents 27a formed in its rear end portion and a recess 27b in its left side for allowing the relay member 42 to open to the outside.

Figure 5:
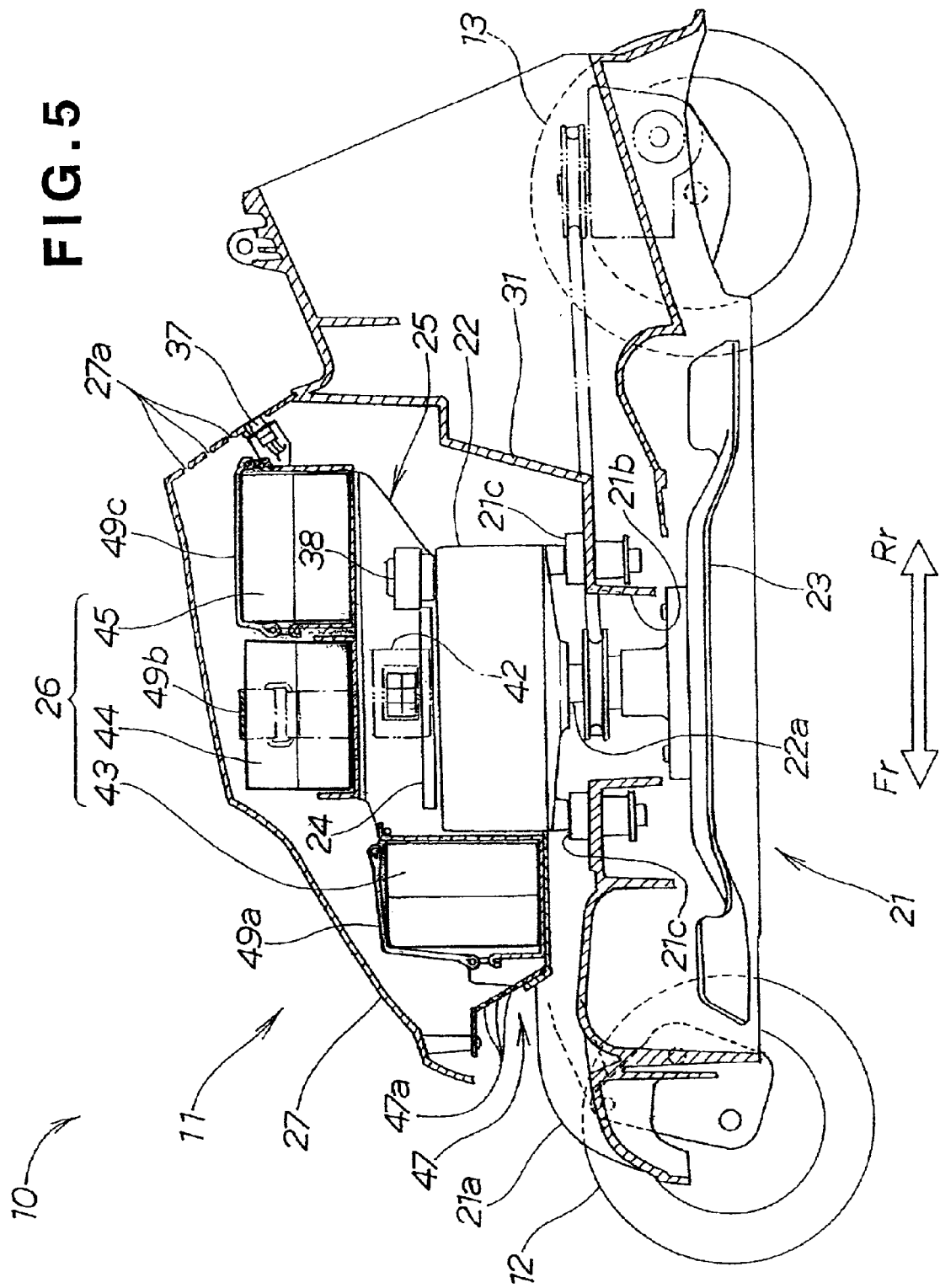
FIG. 5 is a sectional side view of the electric lawn mower taken alone the 5—5 line of FIG. 1.

FIG. 5 is a sectional side view of the electric lawn mower 10 taken along the 5—5 line of FIG. 1. FIG. 5 clearly shows that, in the electric lawn mower 10 where the cutter blade 23 is enclosed in the cutter housing 21, the electric motor 22 is mounted on the upper portion of the cutter housing 21, the motor 22 is driven via the rechargeable battery unit 26, and the battery unit 26 comprises the first and second upper batteries 44 and 45 positioned above the motor 22 and the front battery 43 positioned in front of the motor 22. With the batteries 44 and 45 thus positioned above the motor 22 and the battery 43 positioned in front of the motor 22, it is possible to achieve appropriate weight balance of the electric lawn mower 10, which can thereby greatly improve operability of the electric lawn mower 10.

Further, in the electric lawn mower 10 where the rechargeable battery unit 26 is mounted in the machine body section 11 for driving the electric motor 22 to rotate the cutter blade 23 within the cutter housing 21, the motor 22 and battery unit 26 are covered collectively with the cover member 27, the cover member 27 is shaped to progressively slant upward in the front-to-rear direction of the machine body section 11, the louver openings 47a are formed in its lower front end portion, and the air vents 27a are formed in its upper rear end portion. Thus, this arrangement permits ventilation from the openings 47a to the air vents 27a; that is, the battery unit 26 and motor 22 can be effectively cooled by external cool air being introduced into the cover member 27 through the front louver openings 47a and discharged out of the cover member 27 through the rear air vents 27a. This arrangement can effectively prevent the battery unit 26 and motor 22 from overheating, which thereby allows the electric lawn mower 10 to withstand long-time continuous operation or use.

Figure 6:
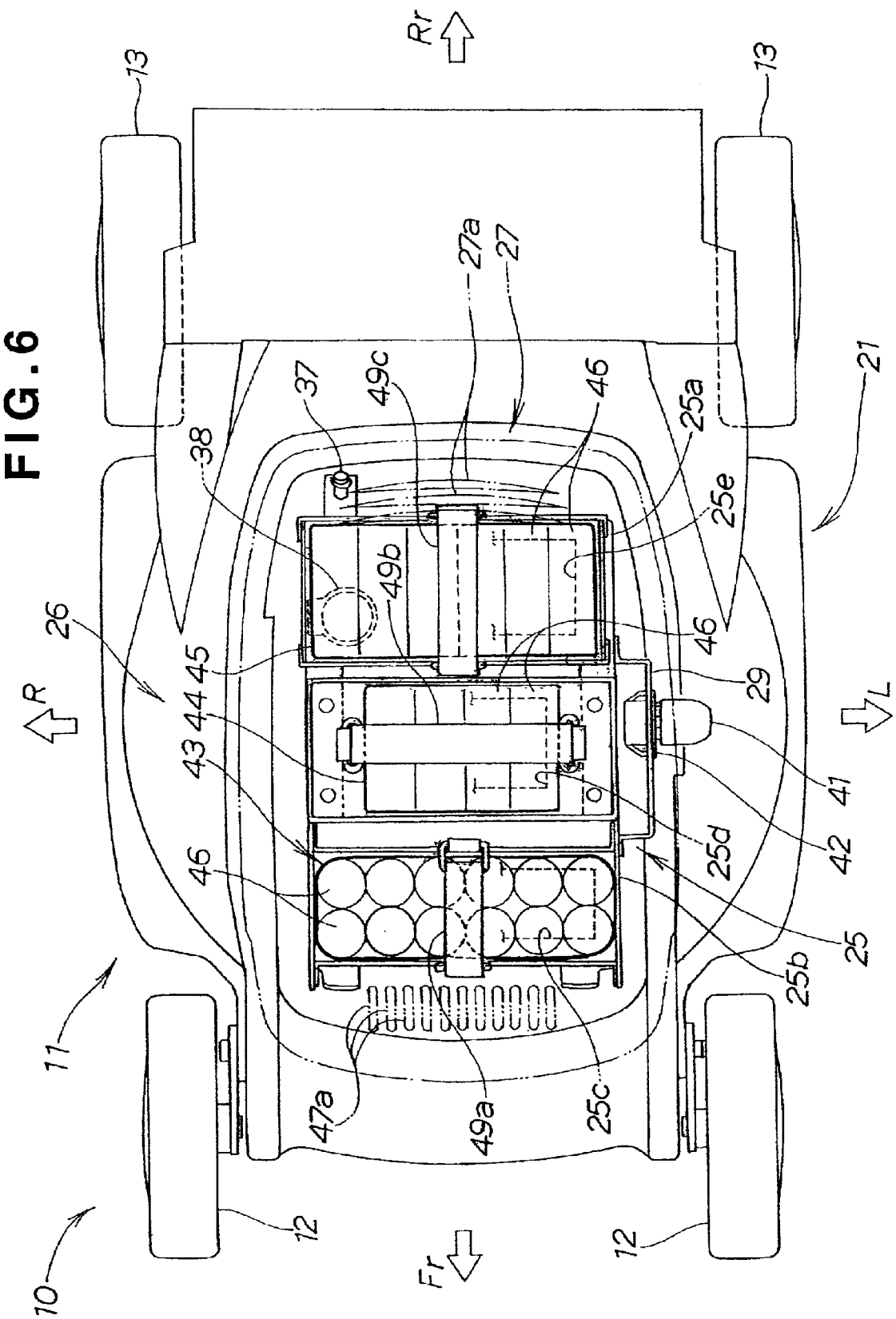
FIG. 6 is a sectional view of the electric lawn mower taken alone the 6—6 line of FIG. 1.

FIG. 6 is a sectional view of the electric lawn mower 10 taken along the 6—6 line of FIG. 1, which shows the mower 10 with the cover member 27 (see FIG. 5) removed for clarity. This figure clearly shows that the cutter housing 21 has fixed thereto the battery bracket 25 including the body portion 25a covering the sides and top of the electric motor 22 and the forward extension 25b extending forward from the body portion 25a, and that the first and second upper batteries 44 and 45 and the front battery 43 are mounted on the body portion 25a and extension 25b, respectively, in a distributed fashion. Such distributed arrangement of the batteries 43, 44 and 45 allows cool air to easily flow among the batteries 43, 44 and 45 and electric motor 22, and thereby promotes heat radiation from the batteries 43, 44 and 45 and motor 22.

Further, because the battery bracket 25 is made of a metal material and has the air vents 25c, 25d and 25e formed where the batteries 43, 44 and 45 are mounted, it is possible to even further promote heat radiation from the batteries 43, 44 and 45 and motor 22. Note that reference numerals 49a, 49b and 49c represent elastic belts that fasten the batteries 43, 44 and 45 to the battery bracket 25.

Figure 7:
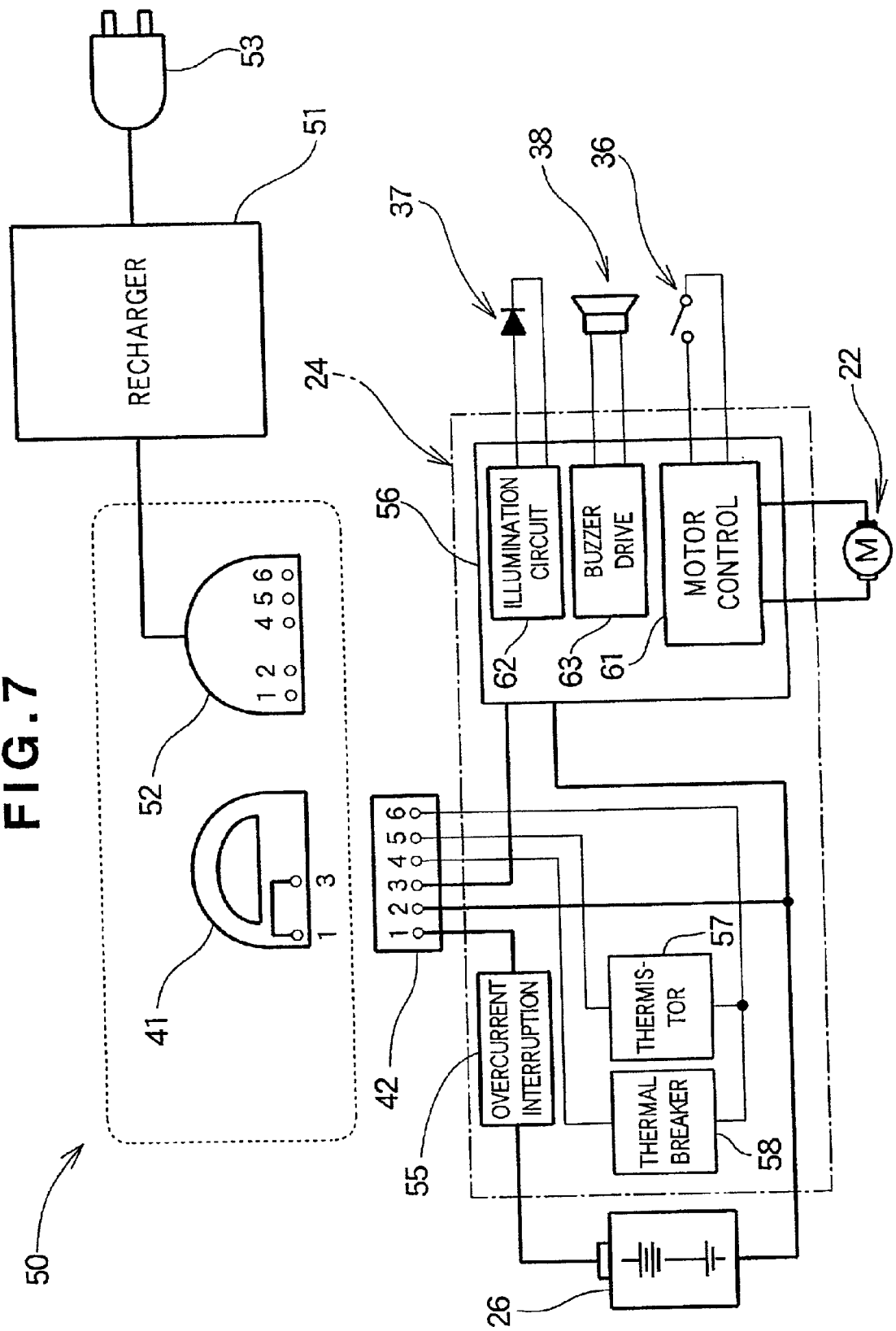
FIG. 7 is a hardware block diagram showing a control system of the electric lawn mower of FIG. 1.

FIG. 7 is a block diagram showing a control system of the electric lawn mower 10 described above in relation to FIGS. 1–6. The control system 50 generally comprises the above-described control section 24 for controlling the electric motor 22, and a recharger 51 for recharging the battery unit 26.

As shown in FIG. 7, the control section 24 includes an overcurrent interruption circuit 55 for interrupting an overcurrent, a control block 56 for controlling behavior of the electric lawn mower 10, a thermistor 57 for monitoring the temperature of the battery unit 26 during the recharge, and a thermal breaker 58 for terminating the recharge on the basis of an output signal from the thermistor 57. The control section 24 also includes the above-described relay member 42 into which either the power on/off key 41 or the plug of the recharger 51 can be selectively inserted as necessary.

The control section 24 constantly monitors, by means of the thermistor 57, the temperature of the battery unit 26 during the recharge; namely, the control section 24 has a function of monitoring and controlling the temperature of the battery unit 26. By the control section 24 having such a battery-temperature controlling function, the battery unit 26 can be recharged with enhanced reliability, as a result of which the battery unit 26 can have prolonged operating life.

The control block 56 includes a motor control circuit 61 for controlling operation of the electric motor 22, an illumination circuit 62 for illuminating the above-mentioned display lamp 37 preferably in the form of a light-emitting diode (LED), and a buzzer drive circuit 63 for driving the buzzer 38. To the motor control circuit 61 is connected the noncontact reed switch 36 of the switch operation mechanism 28 (FIG. 4) for turning on/off the electric motor 22. The illumination circuit 62 keeps illuminating the display lamp 37 as long as the voltage of the battery unit 26 is higher than a predetermined voltage level immediately above a later-described memory-effect inducing voltage level, but deilluminates (turns off) the display lamp 37 once the voltage of the battery unit 26 falls below the predetermined voltage level. Specifically, the illumination circuit 62 keeps illuminating the display lamp 37 except when the voltage of the battery unit 26 is lower than the predetermined voltage level of, for example, 0.97 volts/cell.

By the provision of the display lamp 37 thus kept illuminated while the voltage of the battery unit 26 is exceeding the predetermined voltage level immediately above the memory-effect inducing voltage level, the human operator may safely continue mowing as long as the display lamp 37 is illuminated and stop mowing once the display lamp 37 is turned off. Namely, the display lamp 37 can inform the human operator of appropriate timing to recharge the battery unit 26. As a consequence, it is possible to prevent the operating life of the battery unit 26 from being improperly shortened.

The buzzer drive circuit 63 causes the buzzer 38 to keep sounding as long as the electric motor 22 is rotating, but to stop sounding once the voltage of the battery unit 26 falls below a predetermined voltage level. Namely, in the electric lawn mower 10 of the invention which includes the rechargeable battery unit 26 mounted in the machine body section 11 and which causes the machine body section 11 to travel and perform any of various operations using the battery unit 26 as the driving source for the motor 22, the buzzer 38 can inform the human operator that the electric lawn mower 10 is currently in the actual operating state.

Generally, the motor-driven electric lawn mowers driven by the electric motor can operate with noise much lower than the engine-driven lawn mowers. Thus, where such an electric lawn mower is used in a large noise environment, a human operator may not be able to easily judge, through his or her hearing, whether or not the electric lawn mower is currently in the actual operating state. Thus, by the provision of the buzzer 38 that keeps sounding while the electric motor 22 is rotating to cause the machine body section 11 to travel or perform any of various operations and thereby informs the human operator that the electric lawn mower 10 is currently in the actual operating state, the working efficiency and operability of the lawn mower 10 can be improved.

Further, because the buzzer 38 in the instant embodiment is automatically deactivated when the voltage of the battery unit 26 falls below the predetermined voltage level, it is possible to avoid wasteful power consumption of the battery unit 26.

The above-mentioned relay member 42 is a connector having six connection terminals C1–C6 (denoted simply as "1"–"6" in the figure due to a limited space), of which the first connection terminal C1 functioning as a positive terminal is connected with the positive pole of the battery unit 26 via the overcurrent interruption circuit 55, the second connection terminal C2 connected with the negative pole of the battery unit 26 and one of two input terminals of the control block 56, the third connection terminal C3 connected to the other input terminal of the control block 56, the fourth connection terminal C4 connected with one end of the thermal breaker 58, the fifth connection terminal C5 connected with one end of the thermistor 57 and the sixth connection terminal C6 connected with the respective other ends of the thermal breaker 58 and thermistor 57.

The power on/off key or main key 41 is in the form of a male plug having a pair of electrically connected pins P1 and P3 (denoted simply as "1" and "3" in the figure due to a limited space), which are inserted into the relay member 42 and connected to the first and third connection terminals C1 and C3, respectively, of the relay member 42 to thereby short-circuit between the terminals C1 and C3.

The recharger 51 includes a charging plug 52 for connection to the relay member 42 and a power supply plug 53 for connection to the AC line. The charging plug 52 for recharging the battery unit 26 has pins R1, R2, R4, R5 and R6 (denoted simply as "1", "2", "4", "5", and "6" in the figure due to a limited space) for connection to the first, second, fourth, fifth and sixth connection terminals C1, C2, C4, C5 and C6, respectively, of the relay member 42.

From the foregoing, it should be apparent that the relay member 42 is a connector to which either the power on/off key 41 or the charging plug 52 of the recharger 51 is selectively connectable as necessary. In other words, the same relay member 42 in the electric lawn mower 10 is compatibly connectable with the recharger 51 for recharging the battery unit 26 as well as with the power on/off key 41; that is, the same relay member 42 has two separate connection portions integrally provided thereon, one for connection with the power on/off key 41 and the other for connection with the recharger 51. Thus, the power on/off key 41 can be inserted and connected to the relay member 42 when the electric lawn mower 10 is to operate for the grass cutting purposes, while the recharger 51 can be inserted and connected to the relay member 42 when the battery unit 26 is to be recharged. Owing to the arrangements of the connection terminals of the relay member 42 and pins of the power on/off key 41 and charging plug 52. Thus, it is possible to reliably avoid mis-insertion or mis-connection of the power on/off key 41 or recharger 51. As a result, the electric lawn mower 10 can work with increased convenience and efficiency during the discharge (i.e., grass cutting operations) or recharge of the battery unit 26.

More specifically, in the electric lawn mower 10, the positive connection terminal C1 of the relay member 42, which is directly connected with the positive pole of the battery unit 26, also functions as a recharging positive terminal for connecting the recharger 51 with the positive pole of the battery unit 26. With the positive connection terminal C1 of the relay member 42 thus functioning also as the recharging positive terminal for connection between the positive pole of the battery unit 26 and the recharger 51, it is possible to simplify the construction of the control section 24 and relay member 42. As a result, the necessary overall cost of the electric lawn mower 10 can be reduced to a considerable degree.

Further, in the electric lawn mower 10 of the invention which includes the rechargeable battery unit 26 mounted in the machine body section 11 and which causes the machine body section 11 to travel and perform any of various operations using the battery unit 26 as the driving source, the relay member 42 is provided for electrical connection between the control section 24 and the battery unit 26, and the connecting member (power on/off key) 41 is inserted into the relay member 42 to connect the control section 24 and battery unit 26. Further, removing the connecting member(power on/off key) 41 from there lay member 42 can completely disconnect the control section 24 from the battery unit 26. Such an arrangement can minimize unnecessary electrical discharge from the battery unit 26 during a non-operating or quiescent period of the electric lawn mower 10, and prevent overdischarge during long-time storage of the electric lawn mower 10. As a result, the battery unit 26 can have even longer operating life.

Figure 8:
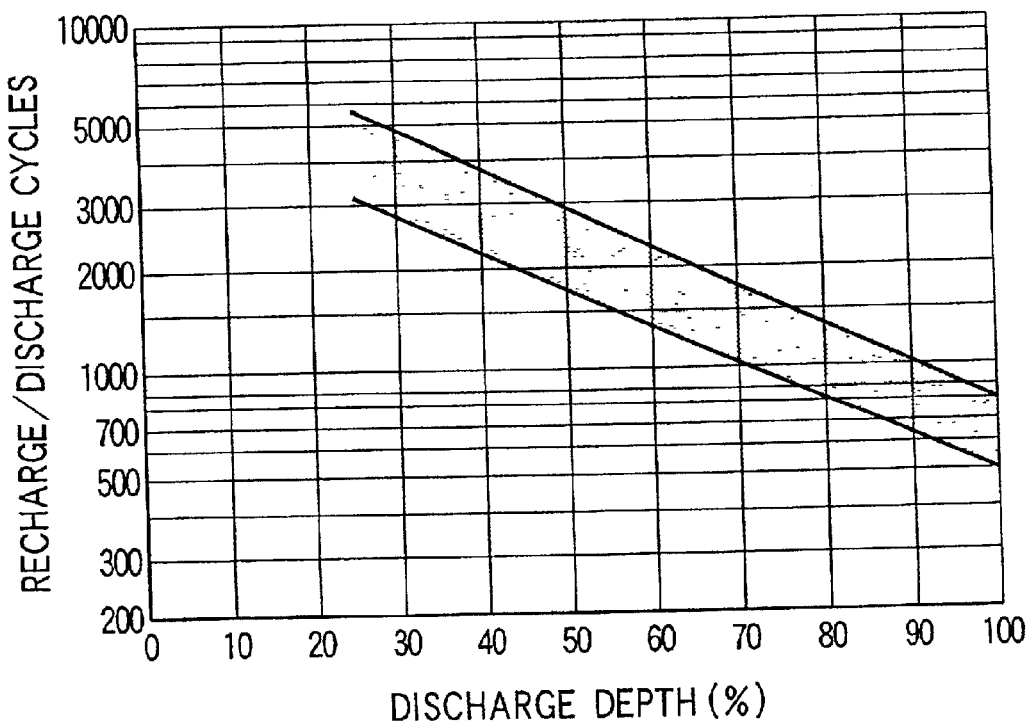
FIG. 8 is a graph explanatory of operating life characteristics of a battery unit employed in the electric lawn mower of FIG. 1.

FIG. 8 is a graph explanatory of operating life characteristics of the battery unit 26 employed in the electric lawn mower 10 of the invention, where the horizontal axis represents a variation in the discharge depth (%) while the vertical axis represents a variation in the number of recharge/discharge cycles. Here, the "discharge depth" means a depth of electrical discharge from the battery unit 26 and is expressed by the percentage; let it be assumed that when the battery unit 26 having a capacity of "100" (provisional value) is completely discharged, the discharge depth is expressed as "100%". The "number of recharge/discharge cycles" means a total number of times the battery unit 26 can be recharged and discharged. As known in the art, the nickel-cadmium battery can restore the capacity even after it has been completely discharged and is thus more tolerant of overdischarge than lead-based or other types of batteries. However, repetition of complete discharge would undesirably lead to shortened operating life of the battery. For example, if the complete discharge of 100% depth is repeated, the number of recharge/discharge cycles is limited to a range of 500 to 800, while if 50%-depth discharge is repeated, the number of recharge/discharge cycles can increase up to a range of 1,700 to 1,800, as illustratively shown in FIG. 8.

Figure 9:
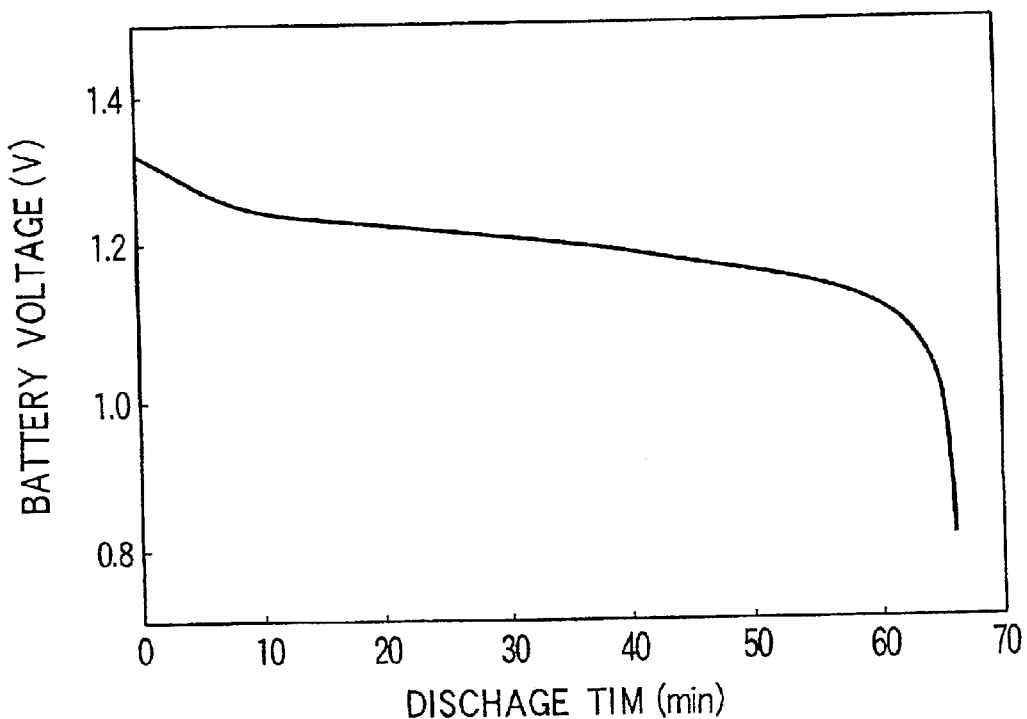
FIG. 9 is a graph explanatory of a memory effect of the battery unit in the electric lawn mower.

FIG. 9 is a graph explanatory of the memory effect of the battery unit 26 employed in the electric lawn mower 10 of the invention, where the horizontal axis represents a variation in the discharge time (min.) while the vertical axis represents a variation in the battery voltage (V). As known in the art, if deep discharge is effected after repetition of shallow discharge, the nickel-cadmium battery would present two-stage voltage drops during the deep discharge, and such a phenomenon is referred to as the memory effect. In the illustrated example, the battery voltage falls slowly from 1.3 V to 1.1 V in a first 60 min. period from the beginning of the discharge. However, after the first 60 min. period elapses, there occurs a rapid drop in the battery voltage.

From the graphs of FIGS. 8 and 9, it can be seen that care must be taken 1) to not repeat complete discharge and 2) to not repeat only shallow discharge that tends to cause the memory effect. Namely, it is desirable that the recharge/discharge be performed with appropriate depth. Having empirically estimated that the memory-effect inducing voltage level is 1.1 volts/cell in the case of the battery having the rated voltage of 1.2 V, the electric lawn mower 10 of the invention is provided with the display lamp 37 (FIG. 5) that is kept illuminated until the battery voltage drops below 9.7 volts/cell with a view to setting the memory-effect inducing voltage level to less than 1.1 volts/cell.

Namely, the electric lawn mower 10 is provided with such a display lamp 37 that is kept illuminated as long as the voltage of the battery unit 26 exceeds the predetermined voltage level immediately above the memory-effect inducing voltage level. With the thus-operating display lamp 37, it is possible to properly indicate to the human operator when the battery unit 26 is to be recharged (recharge timing), to thereby prevent the operating life of the battery unit 26 from being shortened due to improper recharge.

The following paragraphs describe an example of a heat radiation mechanism employed in the above-described electric lawn mower 10.

Figure 10A:
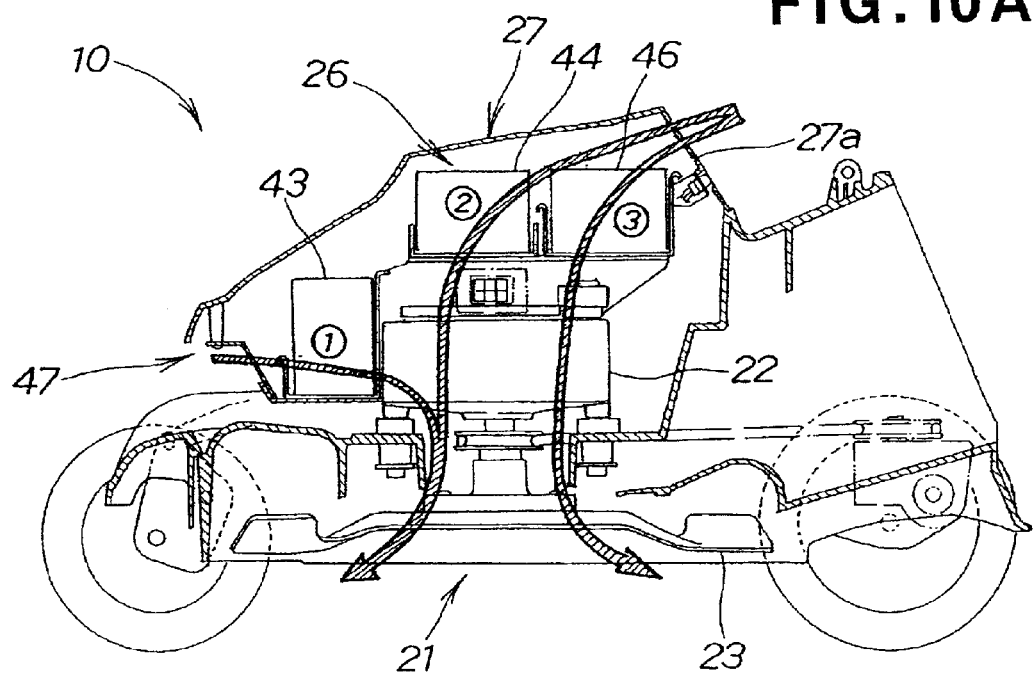
FIGS. 10A and 10B are views explanatory of behavior of the electric lawn mower.
Figure 10B:
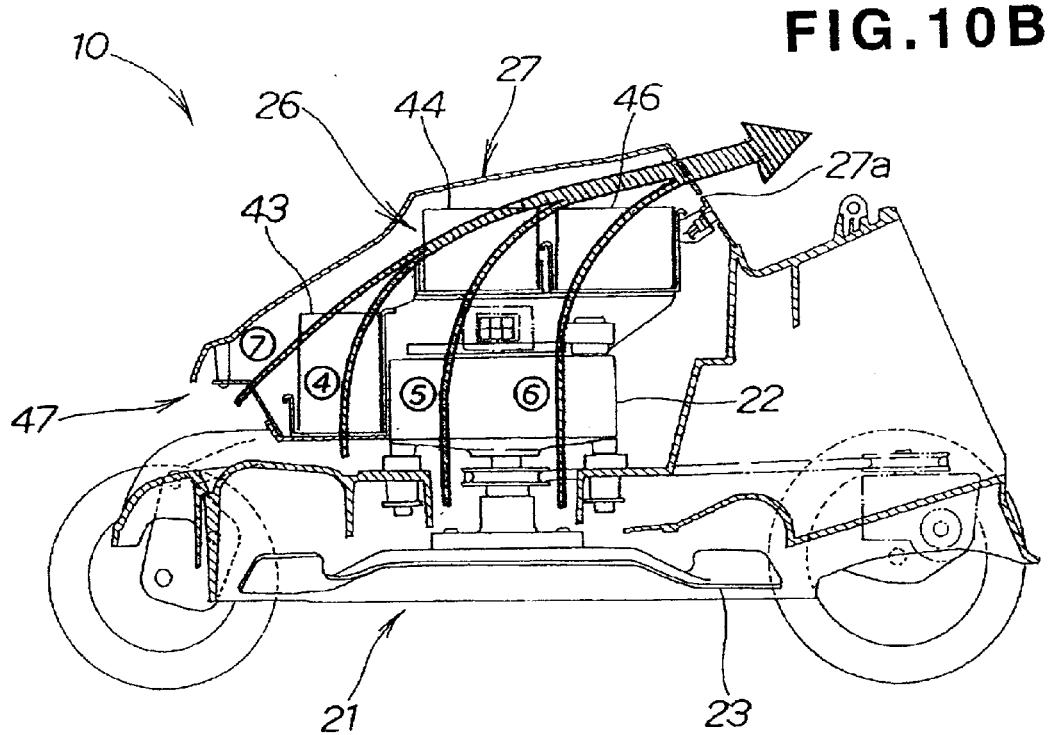

FIGS. 10A and 10B are views explanatory of behavior of the electric lawn mower 10, of which FIG. 10A shows flows of air through the lawn mower 10 while the lawn mower 10 is in operation and FIG. 10B shows flows of air through the lawn mower 10 immediately after the operation of the lawn mower 10 has been terminated. When the lawn mower 10 is in operation as shown in FIG. 10A, the rotating cutter blade 23 produces a negative pressure within the cutter housing 21. Thus, external air is drawn in through the louver openings 47a (FIG. 4), passes along sides of the front battery 43 and flows into the cutter housing 21 through the communication holes 32 (FIG. 4) formed beneath the motor 22, as denoted by arrow 1. In the meantime, external air is also drawn in through the air vents 27a of the cover member 27, passes along sides of the first and second upper batteries 44 and 45 and flows into the cutter housing 21 through the communication holes 32, as denoted by arrow 2 and arrow 3. The air flows indicated by arrows 1–3 can compulsorily cool the front battery 43, first and second upper batteries 44 and 45 and electric motor 22.

Immediately after the electric lawn mower 10 is deactivated as shown in FIG. 10B, the front battery 43, first and second upper batteries 44 and 45 and electric motor 22 are in considerably heated condition. The heat can be radiated from the batteries 43, 44 and 45 and motor 22 by natural convection of the air introduced through the communication holes 32 and passing around the batteries 43, 44 and 45 and motor 22 as denoted by arrows ④–⑥. Such air flows may cause other external air to be drawn in through the louver openings 47a (FIG. 4), pass around the batteries 43, 44 and 45 and motor 22 and escape through the air vents 27a of the cover member 27, as denoted by arrow ⑦, so that further heat radiation of the batteries 43, 44 and 45 and motor 22 can be promoted.

Namely, in the electric lawn mower 10 where the cutter housing 21 has the communication holes 32 communicating with the interior space defined by the cover member 27, the rotating cutter blade 23 produces air flows from the louver openings 47a and air vents 27a into the cutter housing 21 through the communication holes 32. When the cutter blade 23 is not rotating, on the other hand, reverse air flows are produced from within the cutter housing 21 to the air vents 27a through the communication holes 32, due to the heat of the front and upper batteries 43, 44 and 45 and/or motor 22.

Figure 11:
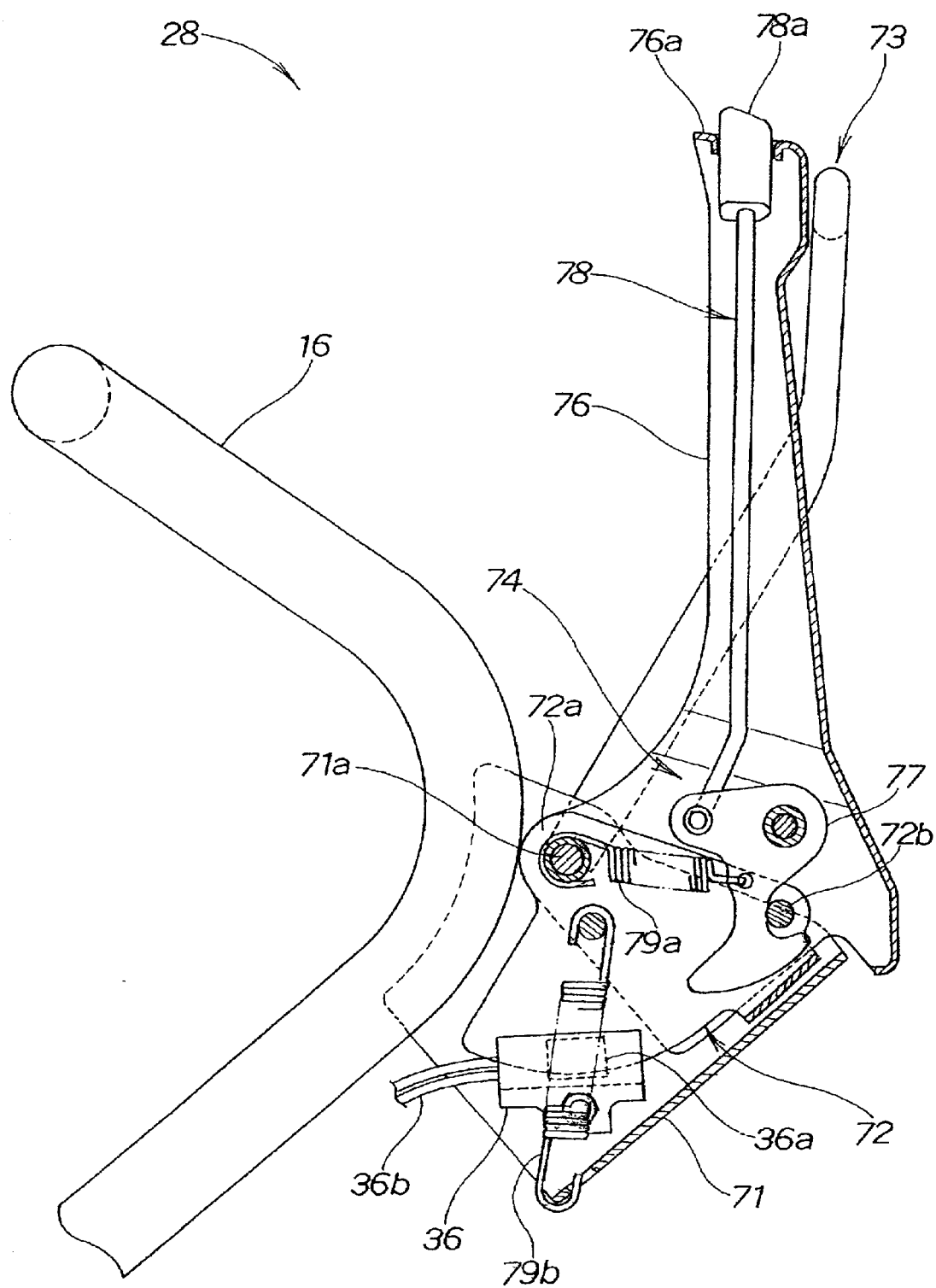
FIG. 11 is a sectional side view of a switch operation mechanism in the electric lawn mower.

FIG. 11 is a sectional side view of the switch operation mechanism 28 in the electric lawn mower 10 of the invention.

The switch operation mechanism 28 is provided on a left end portion of the handle 16 for the human operator to turn on/off the electric motor 22 (see FIG. 2). The switch operation mechanism 28 includes a bracket 71 secured to the left end portion of the handle 16, the noncontact reed switch 36 fixed to the bracket 71, and the fan-shaped actuating member 72 that is pivotally connected at its pivot portion 72a to the bracket 71 and functions to set the ON/OFF state of the reed switch 36. The actuating member 72 is made of a magnetic material, such as an iron-based material. The switch operation mechanism 28 also includes the handling lever 73 for causing the actuating member 72 to pivot, and the clutch mechanism 74 for bringing the handling lever 73 and actuating member 72 into or out of engagement with each other. Reference numeral 71a represents a support pin fixed to or integrally formed on the bracket 71, about which the actuating member 72 can pivot relative to the bracket 71.

The noncontact reed switch 36 has a magnet 36a and is set to the ON or OFF state in accordance with a variation in magnetic flux that is caused by the actuating member 72 moving toward or away from the magnet 36a. Reference numeral 36b in FIG. 11 represents a harness for connecting the reed switch 36 to the control section 24 (see FIG. 4). The handling lever 72 is a generally U-shaped lever, which has a left end pivotally connected via the bracket 71 to an upper left end portion of the handle 16 and has a right end pivotally connected to an upper right end portion of the handle 16.

The clutch mechanism 74 includes a lever member 76 pivotally connected to the bracket 71 and connected to the same shaft as the handling lever 73, a hook member 77 pivotally connected to the lever member 76, and a hook driving rod 78 having one end pivotally connected to the hook member 77 and the other end slidably coupled to a distal end 76a of the lever member 76. The clutch mechanism 74 also includes a tension spring 79a connecting between the hook member 77 and the support pin 71a, an engaging pin 72b provided on the actuating member 72 for engagement with the hook member 77, and a tension spring 79b connecting between the actuating member 72 and the bracket 71. Reference numeral 78a represents a knob of the hook driving rod 78.

Figure 12:
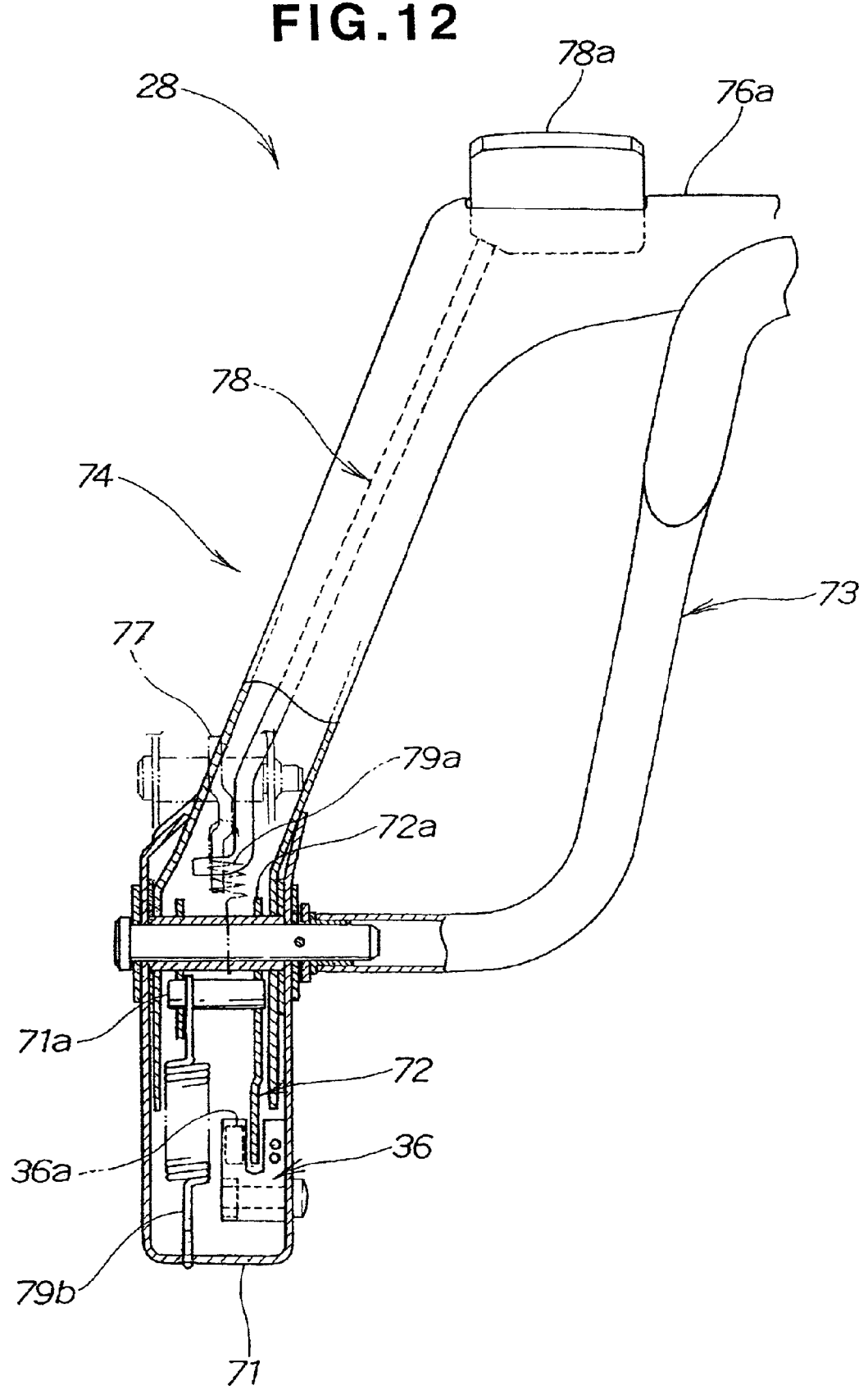
FIG. 12 is a sectional front view of the switch operation mechanism.

FIG. 12 is a sectional front view of the switch operation mechanism 28 in the electric lawn mower 10 of the invention. As clearly seen here, in the electric lawnmower 10a where the electric motor 22 is mounted in the machine body section 11 to drive the cutter blade 23, the handle 16 extends rearward from the machine body section 11 (see FIG. 1) and the switch operation mechanism 28 for turning on or off the motor 22 is mounted on the handle 16, the switch operation mechanism 28 includes the noncontact reed switch 36 for performing ON/OFF control of the motor 22, the fan-shaped actuating member 72 having its pivot portion 72a pivotally connected to the handle 16 for setting the ON/OFF state of the reed switch 36, and the handling lever 73 for causing the actuating member 72 to pivot about the pin 71a. Specifically, the noncontact reed switch 36 is set to the ON/OFF state, depending on whether the actuating member 72 is moved, via the handling lever 73, close to or away from the reed switch 36.

With the arrangement that the fan-shaped actuating member 72 is caused to pivot relative to the reed switch 36 for ON/OFF control of the motor 22, the ON/OFF switching can be performed with increased reliability. Namely, even when the human operator has turned the handling lever 73 through a relatively great angle, the fan-shaped actuating member 72 can remain sufficiently near the reed switch 36, so that the noncontact reed switch 36 can be kept reliably in the ON or OFF state; that is, the reed switch 36 can perform a stable and reliable switching function. For example, if the fan-shaped actuating member 72, pivotable relative to the reed switch 36, is formed into a large size, the setting range for the ON or OFF state of the switch 36 can be increased, which can achieve a higher degree of designing flexibility or freedom. Further, by providing the noncontact reed switch 36 and handling lever 73 at a short distance from each other in the switch operation mechanism 28, a simple and direct switching structure for the ON/OFF control of the cutter-driving electric motor can be achieved.

Furthermore, with the clutch mechanism 74 provided between the handling lever 73 and the actuating member 72 for bringing these components 73 and 72 into or out of engagement with each other, it is possible to reliably prevent erroneous ON/OFF switching operations of the switch operation mechanism 28, and thus the operability and reliability of the electric lawn mower 10 can be enhanced.

Behavior of the above-described switch operation mechanism 28 is described below, with reference to FIGS. 13A to 13C.

FIG. 13A shows the switch operation mechanism 28 before the electric motor 22 is activated. In the illustrated example, the noncontact reed switch 36 is in the OFF state with the actuating member 72 held close to the magnet 36a of the reed switch 36. Further, the clutch mechanism 74 is in a non-clutching state where the hook member 77 is out of engagement with the engaging pin 72b of the actuating member 72, so that the actuating member 72 will not pivot even if the handling lever 73 is turned in an arrow "a" direction (counter clockwise direction in the figure). Namely, in this case, the electric motor 22 does not rotate unless the reed switch 36 is changed from the OFF state to the ON state.

FIG. 13B shows that as the hook driving rod 78 is depressed as denoted by arrow "b1", the hook member 77 pivots into engagement with the engaging pin 72b of the actuating member 72 as denoted by arrow "b2". Then, the handling lever 73 is turned along with the lever member 76 as denoted by arrow "b3", so that the actuating member 72 pivots as denoted by arrow "b4". However, even after the actuating member 72 has pivoted like this, the actuating member 72 is still located close to the magnet 36a of the noncontact reed switch 36, and thus the reed switch 36 still remains in the OFF state.

Then, as shown in FIG. 13C, the handling lever 73 is further turned as denoted by arrow "c1", which causes the actuating member 72 to pivot away from the magnet 36a of the reed switch 36. Thus, the reed switch 36 is set to the ON state, in response to which the rotation of the electric motor 22 is initiated.

It should be appreciated that although the instant embodiment has been described above in relation to the case where the electric motor 22 is mounted by means of the cutter housing bosses 21c so as to define the communication holes 32 communicating between the interior and exterior of the cutter housing 21. In an alternative, such communication holes 32 may be formed directly in the cutter housing 21.

In summary, the present invention is characterized in that the cover member collectively covers the battery and electric motor and is shaped to progressively slant upward in the front-to-rear direction of the machine body section, and that the cover member has openings formed in its lower front end portion and air vents formed in its rear end portion to thereby permit ventilation from the openings to the air vents such that the battery and the electric motor can be cooled by air flows. Such arrangements can effectively prevent the battery unit and motor from overheating, which thereby allows the electric lawn mower to withstand long-time continuous operation or use.

The present disclosure relates to the subject matter of Japanese Patent Application No. 2001-252058, filed Aug. 22, 2001, the disclosure of which is expressly incorporated herein by reference in its entirety.

What is claimed is:

1. An electric lawn mower comprising:
   a machine body section having a cutter housing;
   one or more rechargeable battery units and an electric motor activatable by the battery units, the battery units and electric motor being mounted in the machine body section;
   a battery bracket secured to the cutter housing together as a unit with the electric motor to cover lateral sides and a top surface of the electric motor and having the battery units mounted thereon;
   a cutter blade disposed within the cutter housing and rotatably driven by the electric motor to cut grass; and
   a cover member collectively covering the battery units, the battery bracket and the electric motor, the cover member being shaped to progressively slant upward in a front-to-rear direction of the machine body section and having an opening formed in a lower front end portion thereof and an air vent formed in a rear end portion thereof to thereby permit ventilation from the opening to the air vent such that the battery units and the electric motor can be cooled;
   wherein the cutter housing defines a communication hole communicating with an interior space defined by the cover member; and when the cutter blade is rotating, the communication hole allows an air flow to be produced from the opening and air vent into the cutter housing to thereby cool the battery units and the electric motor in successions, but when the cutter blade is not rotating, the communication hole allows a reverse air flow to be produced from within the cutter housing to the air vent due to heat produced by at least one of the battery units and the electric motor.

2. An electric lawn mower according to claim 1; further comprising a control section disposed between the top surface of the electric motor and the battery bracket for controlling the operation of the electric lawn mower.

3. An electric lawn mower according to claim 2; wherein the control section has at least one of a sound generating unit for generating a sound and a light generating unit for generating a light when the lawn mower is being operated.

4. An electric lawn mower according to claim 1; wherein the air vent of the cover member is located at an upper rear end portion of the cover member, and the battery units comprise at least one front battery unit mounted to the battery bracket forward of the electric motor and adjacent to the opening formed in the lower front end portion of the cover member, and at least one upper battery unit mounted to the battery bracket above the top surface of the electric motor and adjacent to the air vent of the cover member.

5. An electric lawn mower according to claim 1; wherein the machine body section has a scroll portion provided in a rear portion of the cutter housing for ejecting grass cut by the cutter blade; and a grass bag mounted to the machine body section and having an inlet communicating with the scroll portion for receiving and holding the grass ejected by the scroll portion.

6. An electric lawn mower according to claim 1; further comprising a female connector provided on the machine body section and electrically connected between the motor and the battery unit to enable operation of the lawn mower only when a male key switch is inserted therein for electrically connecting the battery unit and the electric motor.

7. An electric lawn mower according to claim 6; further comprising a scroll portion provided in the cutter housing for ejecting grass cut by the cutter blade, the scroll portion being provided proximate to an opposite lateral side of the machine body section at which the female connector is provided, so that an operator can remove the key switch and turn the machine body section onto one lateral side to access the scroll portion for cleaning grass clippings therefrom without moving from one lateral side to the other.

8. An electric lawn mower according to claim 6; wherein the battery bracket has a body portion that covers the lateral sides and the top surface of the electric motor, a forward extension portion extending horizontally forward from the body portion, a mounting bracket onto which the female connector is mounted, and air vents formed in the body portion and the forward extension to promote cooling.

9. An electric lawn mower according to claim 8; wherein the battery units comprise one or more upper battery units mounted to the body portion above the top surface of the electric motor and one or more front battery units mounted to the forward extension forward of the electric motor so as to achieve weight balance of the electric lawn mower.

10. An electric lawn mower according to claim 9; wherein the upper battery units and the front battery units each comprise a plurality of individual rechargeable batteries held together.

11. An electric lawn mower according to claim 10; wherein the individual rechargeable batteries are mounted to the battery bracket with an orientation that maximizes air flow thereacross due to an airflow produced by operation of the cutter blade.

12. An electric lawn mower according to claim 6; wherein the female connector is configured to receive a male plug from a battery charger for charging the battery units only when the key switch is removed.

13. An electric lawn mower according to claim 12; further comprising a battery overheat detection circuit for disconnecting the battery units from the charger when an overheated state of the battery units is detected during battery charging.

14. An electric lawn mower according to claim 13; wherein the overheat detection circuit comprises a thermistor and a thermal breaker.

15. An electric lawn mower according to claim 12; further comprising an overcurrent detection circuit for disconnecting the battery units from the charger or the electric motor when an overcurrent state of the battery units is detected.

16. An electric lawn mower according to claim 1; further comprising a handle extending rearward from the machine body section; and a switch operation mechanism provided on the handle for performing ON/OFF control of the electric motor.

17. An electric lawn mower comprising: a housing containing a cutting blade; a drive unit mounted as a single unit to the housing and comprising an electric motor having an output shaft connected to the cutting blade, a bracket mounted to the electric motor and having a top surface above a top surface of the electric motor, side surfaces covering side surfaces of the electric motor and a front surface extending forward of the electric motor, and a plurality of battery units for driving the electric motor and comprising one or more upper battery units mounted to the top surface of the bracket and one or more front battery units mounted to the front surface of the bracket forward of the electric motor for driving the electric motor; and a cover member collectively covering the battery units, the bracket and the electric motor, the cover member being shaped to progressively slant upward in a front-to-rear direction of the housing and having an opening formed in a lower front end portion thereof and an air vent formed in a rear end portion thereof to permit ventilation from the opening to the air vent to cool the battery units and the electric motor in succession; wherein negative pressure produced by rotation of the cutting blade generates a first airflow in a direction from the opening and air vent of the cover member toward the cutting blade to cool the battery units and the electric motor in succession, and heat produced by the electric motor and the battery units generates a second airflow in a direction from the cutting blade to the air vent when the cutting blade is not rotating.

18. An electric lawn mower comprising:

a machine body section having a cutter housing;

one or more rechargeable battery units and an electric motor activatable by the battery units, the battery units and electric motor being mounted in the machine body section;

a female connector provided on the machine body section and electrically connected between the motor and the battery unit to enable operation of the lawn mower only when a male key switch is inserted therein for electrically connecting the battery unit and the electric motor;

a battery bracket secured to the cutter housing together as a unit with the electric motor to cover lateral sides and a top surface of the electric motor and having the battery units mounted thereon, the battery bracket having a body portion that covers the lateral sides and the top surface of the electric motor, a forward extension portion extending horizontally forward from the body portion, a mounting bracket onto which the female connector is mounted, and air vents formed in the body portion and the forward extension to promote cooling;

a cutter blade disposed within the cutter housing and rotatably driven by the electric motor to cut grass; and a cover member collectively covering the battery units, the battery bracket and the electric motor, the cover member being shaped to progressively slant upward in a front-to-rear front-to-rear direction of the machine body section and having an opening formed in a lower front end portion thereof and an air vent formed in a rear end portion thereof to thereby permit ventilation from the opening to the air vent such that the battery units and the electric motor can be cooled.

19. An electric lawn mower according to claim 18; wherein the battery units comprise one or more upper battery units mounted to the body portion above the top surface of the electric motor and one or more front battery units mounted to the forward extension forward of the electric motor so as to achieve weight balance of the electric lawn mower.

20. An electric lawn mower according to claim 19; wherein the upper battery units and the front battery units each comprise a plurality of individual rechargeable batteries held together.

21. An electric lawn mower according to claim 20; wherein the individual rechargeable batteries are mounted to the battery bracket with an orientation that maximizes air flow thereacross due to an airflow produced by operation of the cutter blade.

* * * * *